US012650041B2

(12) United States Patent
DeMaranville

(10) Patent No.: US 12,650,041 B2
(45) Date of Patent: Jun. 9, 2026

(54) SUPPLEMENTAL LOCKING DEVICE FOR A CARGO CONTAINER

(71) Applicant: Brandon DeMaranville, Tomball, TX (US)

(72) Inventor: Brandon DeMaranville, Tomball, TX (US)

( * ) Notice: Subject to any disclaimer, the term of this patent is extended or adjusted under 35 U.S.C. 154(b) by 470 days.

(21) Appl. No.: 18/086,945

(22) Filed: Dec. 22, 2022

(65) Prior Publication Data

US 2023/0193669 A1 Jun. 22, 2023

Related U.S. Application Data

(60) Provisional application No. 63/292,456, filed on Dec. 22, 2021.

(51) Int. Cl.
*E05C 19/18* (2006.01)
*E05B 13/00* (2006.01)
*E05B 67/38* (2006.01)

(52) U.S. Cl.
CPC .......... *E05C 19/188* (2013.01); *E05B 13/001* (2013.01); *E05B 67/38* (2013.01)

(58) Field of Classification Search
CPC .......... E05B 83/02; E05B 83/10; E05B 83/38; E05B 13/00; E05B 13/001; E05B 13/002; E05B 67/383; E05B 67/38; E05B 55/06; E05B 65/0894; E05B 83/12; E05C 7/04; E05C 19/003; E05C 19/186; E05C 19/188
USPC ...................................... 292/321, 259 R, 282
See application file for complete search history.

(56) References Cited

U.S. PATENT DOCUMENTS 5,036,684 A * 8/1991 Zivanovic ............... E05B 83/10 16/361
5,077,940 A * 1/1992 LaRose, Jr. ........... E05C 19/003 292/259 R
D351,984 S 11/1994 Navarsky
5,477,710 A * 12/1995 Stefanutti ............... E05B 67/38 70/56
5,737,946 A * 4/1998 Sole ...................... E05B 13/001 292/205
5,743,118 A * 4/1998 Anderson ............. E05B 13/002 292/205
5,775,747 A * 7/1998 Navarsky .............. G09F 3/0364 292/307 R
5,924,314 A * 7/1999 Cernansky .......... E05B 17/2084 70/56
5,934,116 A * 8/1999 Moore .................. E05C 19/184 292/259 R
6,113,163 A 9/2000 Liroff (Continued)

FOREIGN PATENT DOCUMENTS

GB 2062084 A * 5/1981 ............. E05B 83/10
GB 2257100 A * 1/1993 ............... B60D 1/60

(Continued)

*Primary Examiner* — Kristina R Fulton
*Assistant Examiner* — Emily G. Brown
(74) *Attorney, Agent, or Firm* — Cramer Patent & Design, PLLC.; Aaron R. Cramer

(57) ABSTRACT

A supplemental locking device particularly suited for use on a cargo container. The device consists of a three-sided channel, made of heavy-gauge steel that fits over the locking mechanism of a cargo container capable of being slipped over this locking system with the aid of oval cut slots on the sides that accommodate any horizontal members.

12 Claims, 10 Drawing Sheets

(56) References Cited

U.S. PATENT DOCUMENTS

| | | | | |
|---|---|---|---|---|
| 6,412,835 | B1 * | 7/2002 | Patterson | E05B 83/12 292/259 R |
| 6,519,982 | B1 * | 2/2003 | Brammall | E05B 67/38 292/205 |
| 6,581,419 | B1 * | 6/2003 | Strodtman | E05B 67/38 292/205 |
| 6,834,896 | B2 | 12/2004 | Smith | |
| 7,278,284 | B1 * | 10/2007 | James | E05B 13/002 292/205 |
| 7,278,663 | B2 | 10/2007 | Witchey | |
| 7,380,846 | B1 | 6/2008 | Moreno | |
| 7,412,856 | B1 * | 8/2008 | Gogel | E05B 67/38 70/56 |
| 7,757,523 | B1 * | 7/2010 | Garcia | E05B 67/383 70/20 |
| 7,930,914 | B1 * | 4/2011 | Taylor | E05B 73/0076 70/56 |
| 8,011,213 | B1 * | 9/2011 | Gogel | E05B 83/10 292/259 R |
| 8,056,945 | B2 | 11/2011 | Moreno | |
| 8,689,590 | B2 * | 4/2014 | Madruga | E05B 65/0089 70/164 |
| 9,562,374 | B1 * | 2/2017 | Haber | E05B 83/14 |
| D836,419 | S | 12/2018 | Marsden | |
| 11,008,787 | B2 | 5/2021 | Rudd | |
| 11,346,135 | B1 * | 5/2022 | King | E05B 67/38 |
| 2002/0185872 | A1 * | 12/2002 | Brammall | E05B 13/001 292/286 |
| 2004/0070218 | A1 * | 4/2004 | Smith | E05C 19/18 292/339 |
| 2007/0089467 | A1 * | 4/2007 | Ace-Kirker | B60R 25/093 70/63 |
| 2012/0103032 | A1 * | 5/2012 | Thomsen | E05B 13/002 70/14 |
| 2012/0248100 | A1 * | 10/2012 | Lancaster | B65D 90/008 220/1.5 |

FOREIGN PATENT DOCUMENTS

| | | | | | |
|---|---|---|---|---|---|
| GB | 2367091 | A | * | 3/2002 | E05B 67/383 |
| WO | WO-2016110603 | A1 | * | 7/2016 | E05B 83/10 |

* cited by examiner

SUPPLEMENTAL LOCKING DEVICE FOR A CARGO CONTAINER

RELATED APPLICATIONS

The present invention was first described in and is a continuation of U.S. Provisional Patent Application No. 63/292,456 filed on Dec. 22, 2021, the entire disclosures of which are incorporated herein by reference.

FIELD OF THE INVENTION

The present invention relates generally to a supplemental locking device particularly suited for use on a cargo container.

BACKGROUND OF THE INVENTION

Intermodal containers are used for the intermodal transport of freight. These standardized cargo containers, also known as "Conex" containers, are suitable for multiple transportation methods such as truck, rail, or ship. They also spend a great deal of time stationary such as at a shipping facility or when sitting at a destination being loaded or unloaded. During such times when not in active use, these containers are typically secured and locked with a padlock.

While the locking mechanism is generally robust, the weak link remains the padlock which can be broken or cut in minimal time. Accordingly, there exists a need for a means by which security for cargo containers can be increased to reduce the occurrence of unauthorized access. The use of a supplemental locking device for a cargo container provides for increased physical protection of cargo containers in a manner which is not only quick, easy and effective, but safe and secure as well.

SUMMARY OF THE INVENTION

To achieve the above and other objectives, the present invention provides for an a supplemental locking device having a bottom wall surface, a top wall surface, a first end wall, a second end wall opposite the first end wall, a first side wall, and a second side wall opposite the first side wall, a plurality of side wall notches disposed along the first side wall, the side wall notches extend downward, a plurality of first side wall slots disposed along the top portion of the first side wall, a plurality of second side wall slots disposed along the top portion of the second side wall, the first side wall slots and the second side wall slots are aligned with each other, a plurality of upright members disposed along a bisecting longitudinal axial centerline of the bottom wall surface, the upright members extend upward therefrom a terminate prior to a plurality of top edges of the first end wall, the second end wall, the first side wall, and the second side wall, an aperture disposed adjacent an upper edge of each of the upright members, and at least one handle affixed to the top wall surface adapted to enable manipulating of the supplemental locking device onto a door of a cargo container.

The side wall notches may be equidistantly spaced apart from each other. The side wall notches may be coextensive with the height of the first side wall. The side wall notches may be shaped to accommodate a bar of the door of the cargo container. The first side wall slots and the second side wall slots may have a laterally extending section shaped to accommodate the bar of the door of the cargo container. The first side wall slots may extend downward and forward. The second side wall slots may extend downward and forward.

A first alternate supplemental locking device has a first alternate bottom wall surface, a first alternate top wall surface, a first alternate first end wall, a first alternate second end wall opposite the first alternate first end wall, a first alternate first side wall, and a first alternate second side wall opposite the first alternate first side wall, a plurality of first alternate side wall notches disposed along the first alternate first side wall, the first alternate side wall notches extend downward, a plurality of first alternate first side wall slots disposed along the top portion of the first alternate first side wall, the first alternate first side wall slots extend downward and forward, a plurality of first alternate second side wall slots disposed along the top portion of the first alternate second side wall, the first alternate second side wall slots extend downward and forward, a plurality of first alternate upright members disposed along a bisecting longitudinal axial centerline of the first alternate bottom wall surface and extend upward therefrom a terminate prior to a plurality of top edges of the first alternate first end wall, the first alternate second end wall, the first alternate first side wall, and the first alternate second side wall, a first alternate aperture disposed adjacent an upper edge of each of the first alternate upright member, and at least one first alternate handle affixed to the first alternate top wall surface adapted to enable manipulating of the first alternate supplemental locking device onto a door of a cargo container.

The first alternate side wall notches may be equidistantly spaced apart from each other. The first alternate side wall notches may be coextensive with the first alternate first side wall. The first alternate side wall notches may be shaped to accommodate a bar of a rear door of a vehicle. The first alternate first side wall slots and the first alternate second side wall slots may be aligned with each other. The first alternate first side wall slots and the first alternate second side wall slots may have a laterally extending section shaped to accommodate a bar of the door of the cargo container. A second alternate supplemental locking device has a second alternate bottom wall surface, a second alternate top wall surface, a second alternate first end wall, a second alternate second end wall opposite the second alternate first end wall, a second alternate first side wall, and a second alternate second side wall opposite the second alternate first side wall, a plurality of second alternate side wall notches disposed along the second alternate first side wall, the second alternate side wall notches extend downward, a plurality of second alternate first side wall slots disposed along the top portion of the second alternate first side wall, the second alternate first side wall slots extend downward and forward, a plurality of second alternate second side wall slots disposed along the top portion of the second alternate second side wall, the second alternate second side wall slots extend downward and forward, a plurality of second alternate upright members disposed along a bisecting longitudinal axial centerline of the second alternate bottom wall surface and extend upward therefrom a terminate prior to a plurality of top edges of the second alternate first end wall, the second alternate second end wall, the second alternate first side wall, and the second alternate second side wall, a second alternate aperture disposed adjacent an upper edge of each of the second alternate upright members, and at least one second alternate handle affixed to the second alternate top wall surface adapted to enable manipulating of the second alternate supplemental locking device onto a door of a cargo container.

The second alternate side wall notches may be equidistantly spaced apart from each other. The second alternate side wall notches may be coextensive with the height of the second alternate first side wall. The second alternate side wall notches may be shaped to accommodate a bar of the door of the cargo container. The second alternate first side wall slots and the second alternate second side wall slots may have a laterally extending section shaped to accommodate the bar of the door of the cargo container. The second alternate first side wall slots and the second alternate second side wall slots may be aligned with each other. The second alternate supplemental locking device may be each fabricated out of heavy-gauge folded ten-gauge steel.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
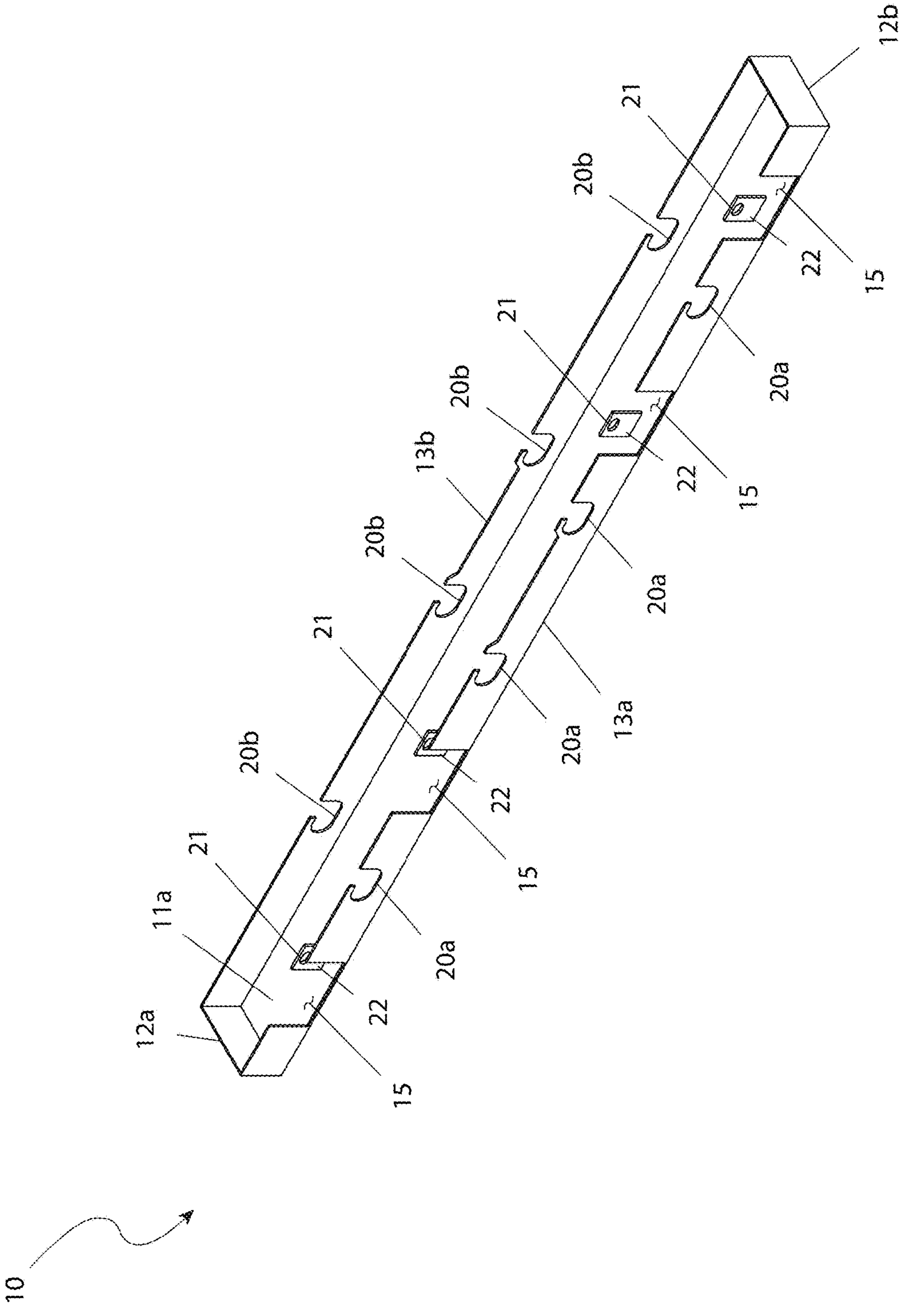
FIG. 1 is a first perspective view of a supplemental locking device, according to a preferred embodiment of the present invention.

10 supplemental locking device
11*a* bottom wall surface
11*b* top wall surface
12*a* first end wall
12*b* second end wall
13*a* first side wall
13*b* second side wall
15 side wall notch
20*a* first side wall slot
20*b* second side wall slot
21 upright member
22 aperture
30 handle
40 cargo container
50 door
60 existing locking means
70 bar
100 first alternate locking device
111*a* first alternate bottom wall surface
111*b* first alternate top wall surface
112*a* first alternate first end wall
112*b* first alternate second end wall
113*a* first alternate first side wall
113*b* first alternate second side wall
115 first alternate side wall notch
120*a* first alternate first side wall slot
120*b* first alternate second side wall slot
121 first alternate upright member
122 first alternate aperture
130 first alternate handle
200 second alternate locking device
211*a* second alternate bottom wall surface
211*b* second alternate top wall surface
212*a* second alternate first end wall
212*b* second alternate second end wall
213*a* second alternate first side wall
213*b* second alternate second side wall
215 second alternate side wall notch
220*a* second alternate first side wall slot
220*b* second alternate second side wall slot
221 second alternate upright member
222 second alternate aperture
230 second alternate handle

DESCRIPTION OF THE INVENTION

Figure 2:
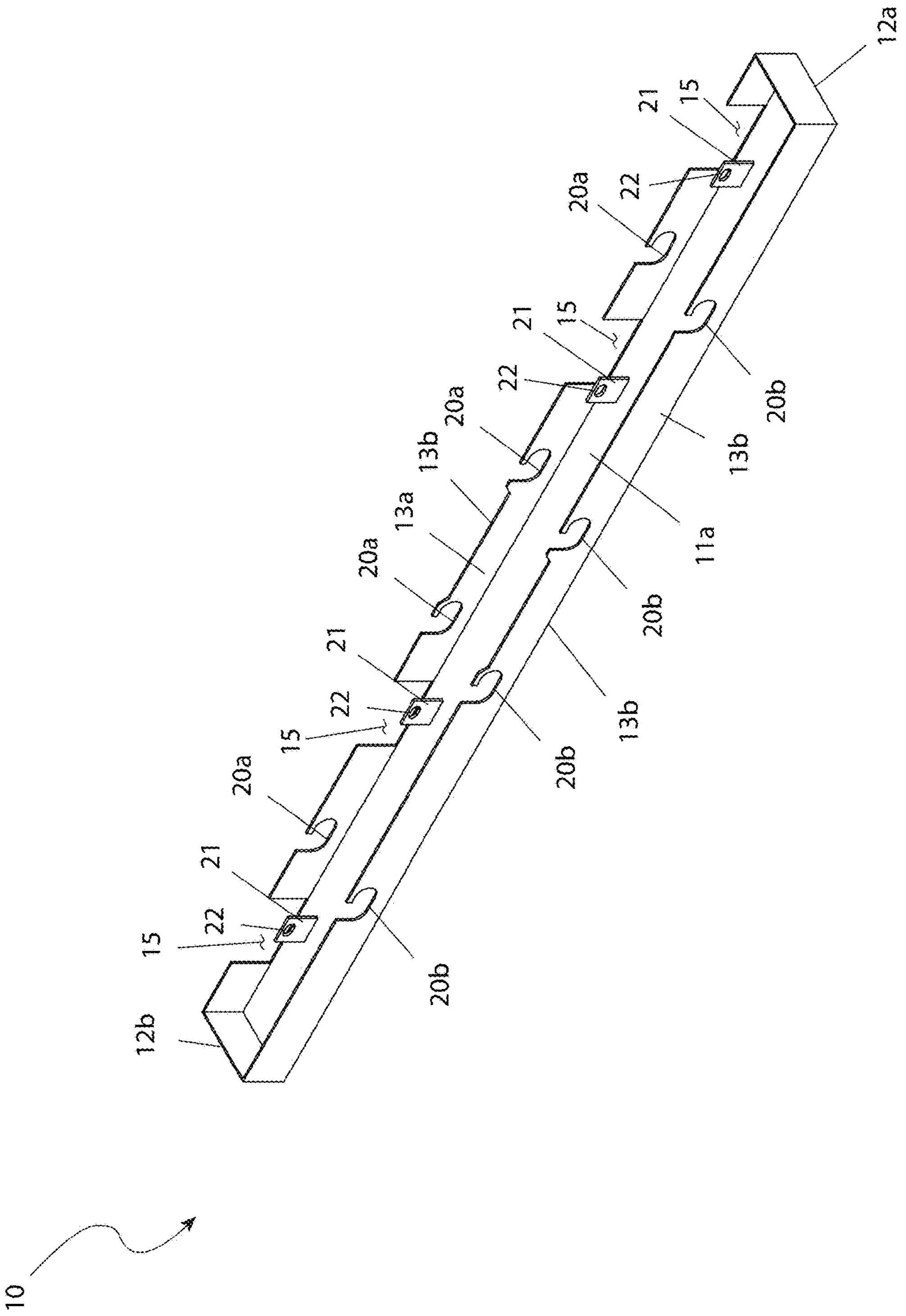
FIG. 2 is a second perspective view of the supplemental locking device, according to the preferred embodiment of the present invention.
Figure 3:
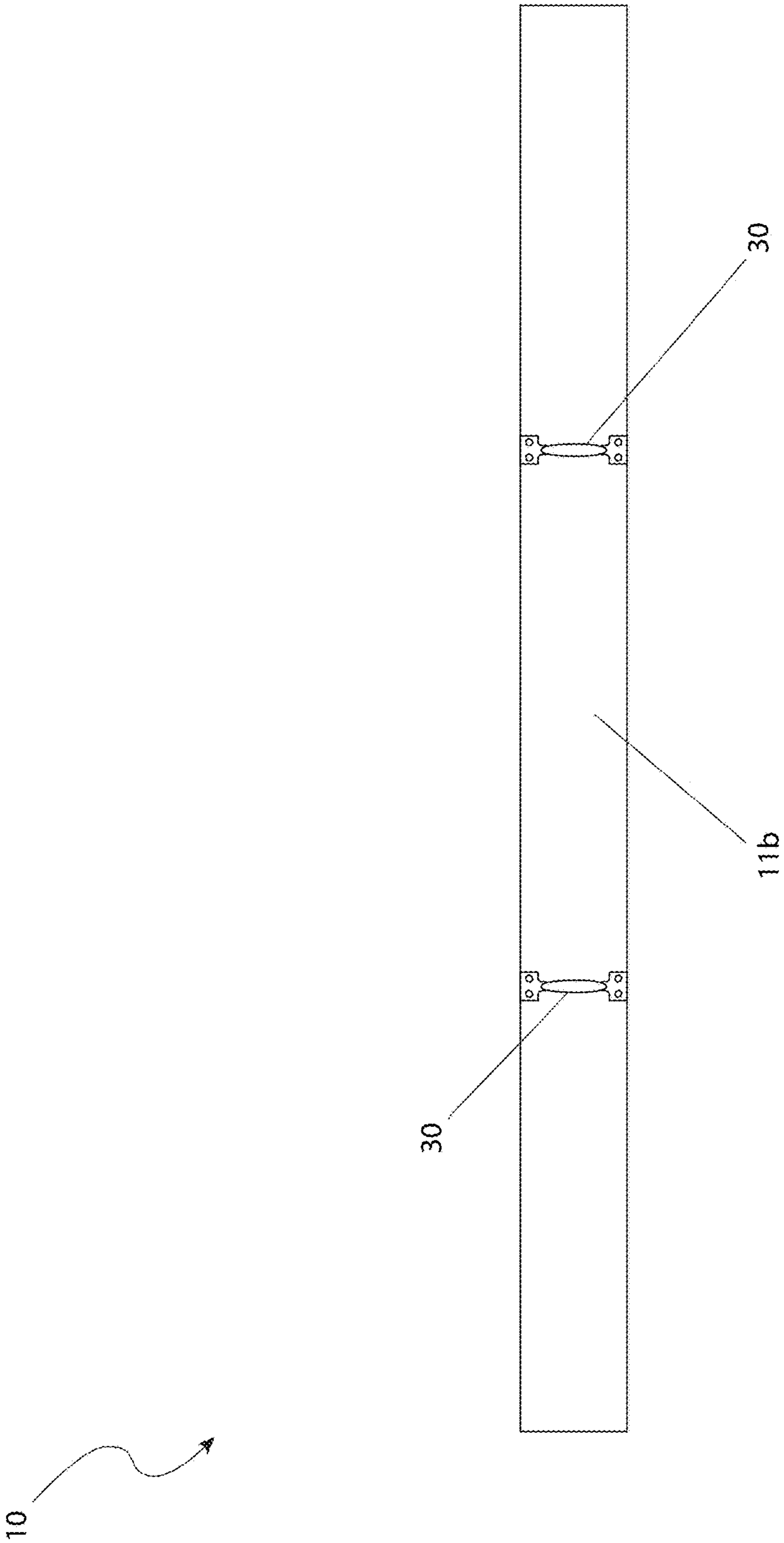
FIG. 3 is a front view of the supplemental locking device, according to the preferred embodiment of the present invention.
Figure 4:
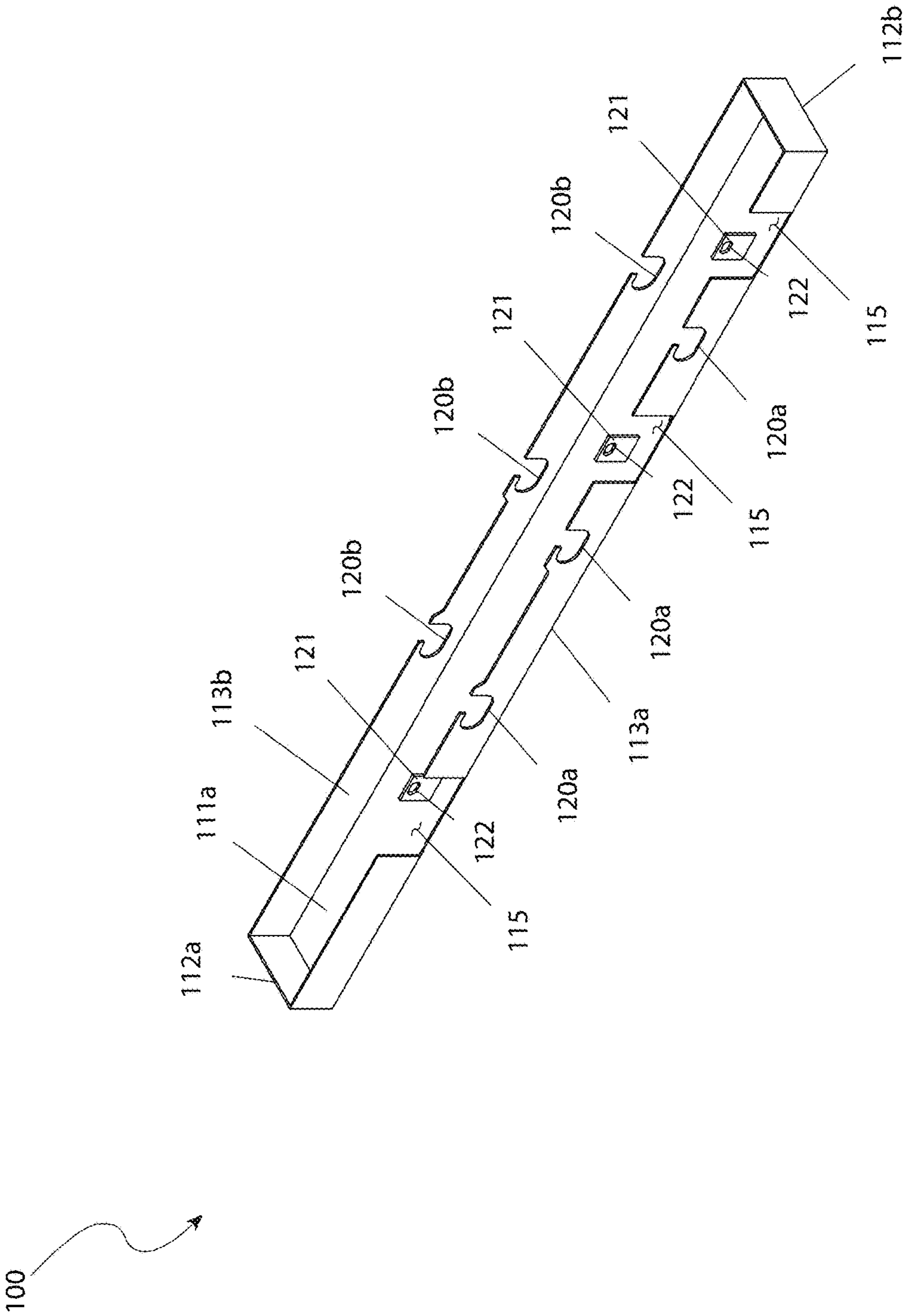
FIG. 4 is a first perspective view of a first alternate supplemental locking device, according to a first alternate embodiment of the present invention.
Figure 5:
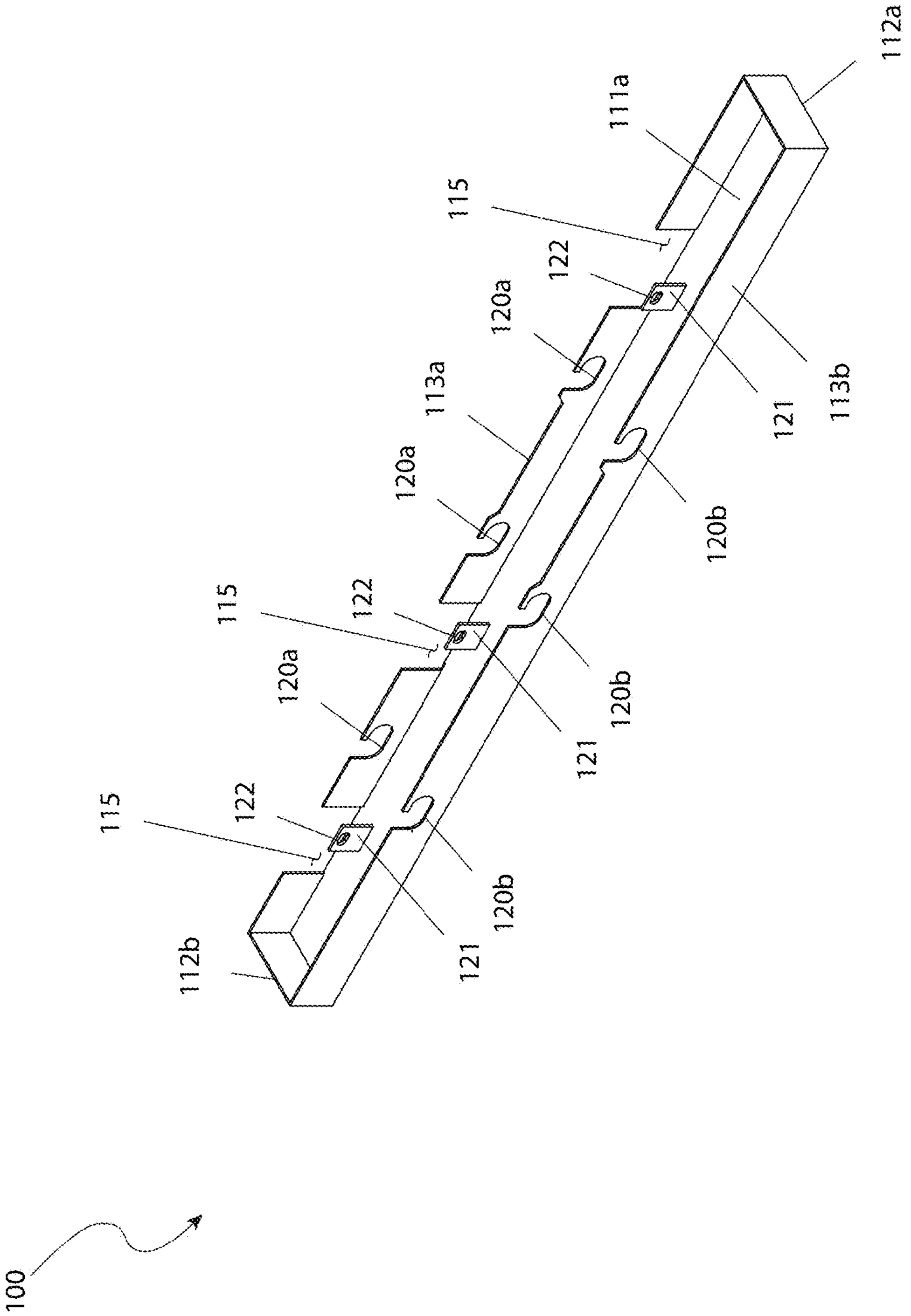
FIG. 5 is a second perspective view of the first alternate supplemental locking device, according to the first alternate embodiment of the present invention.
Figure 6:
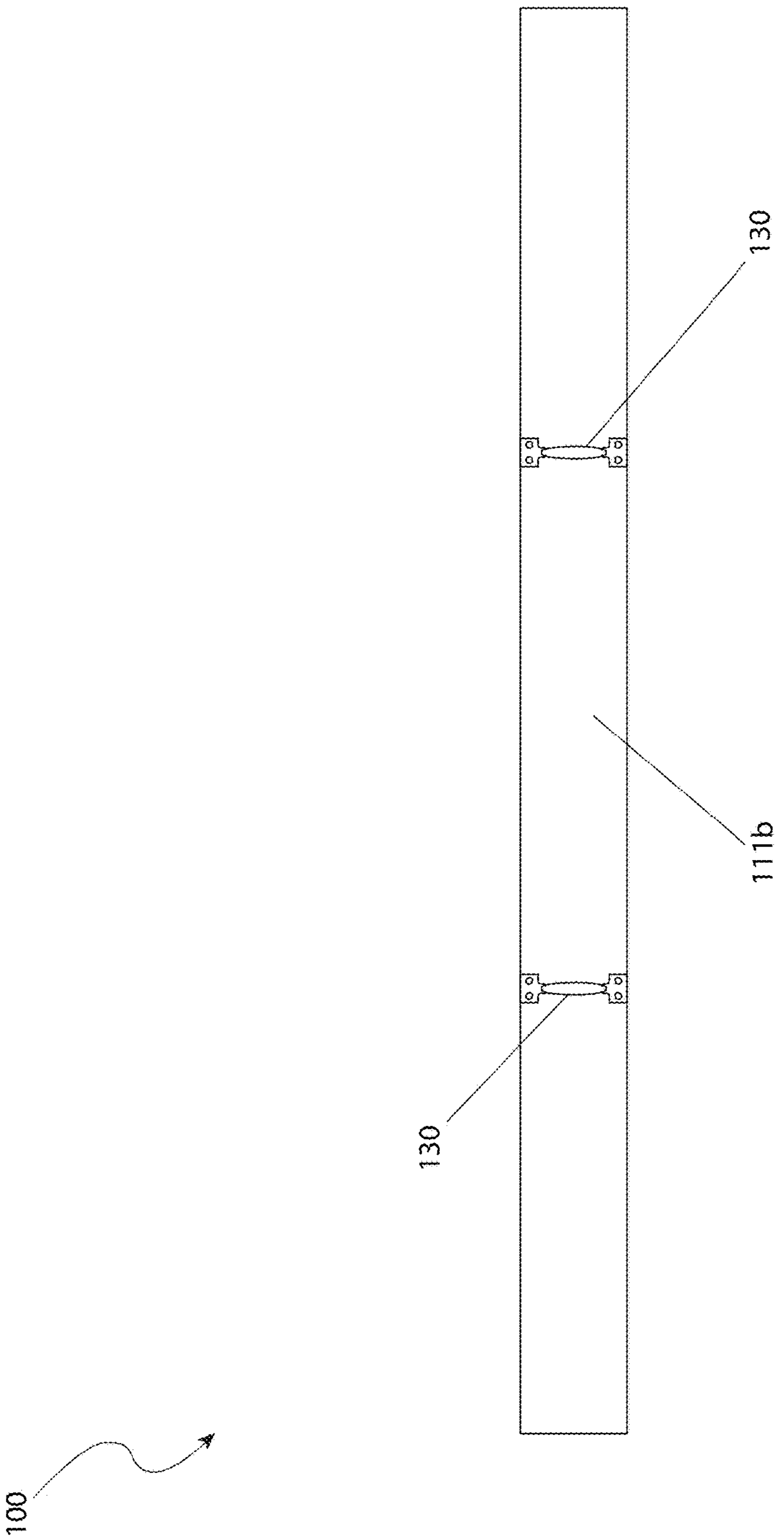
FIG. 6 is a front view of the first alternate supplemental locking device, according to the first alternate embodiment of the present invention.
Figure 7:
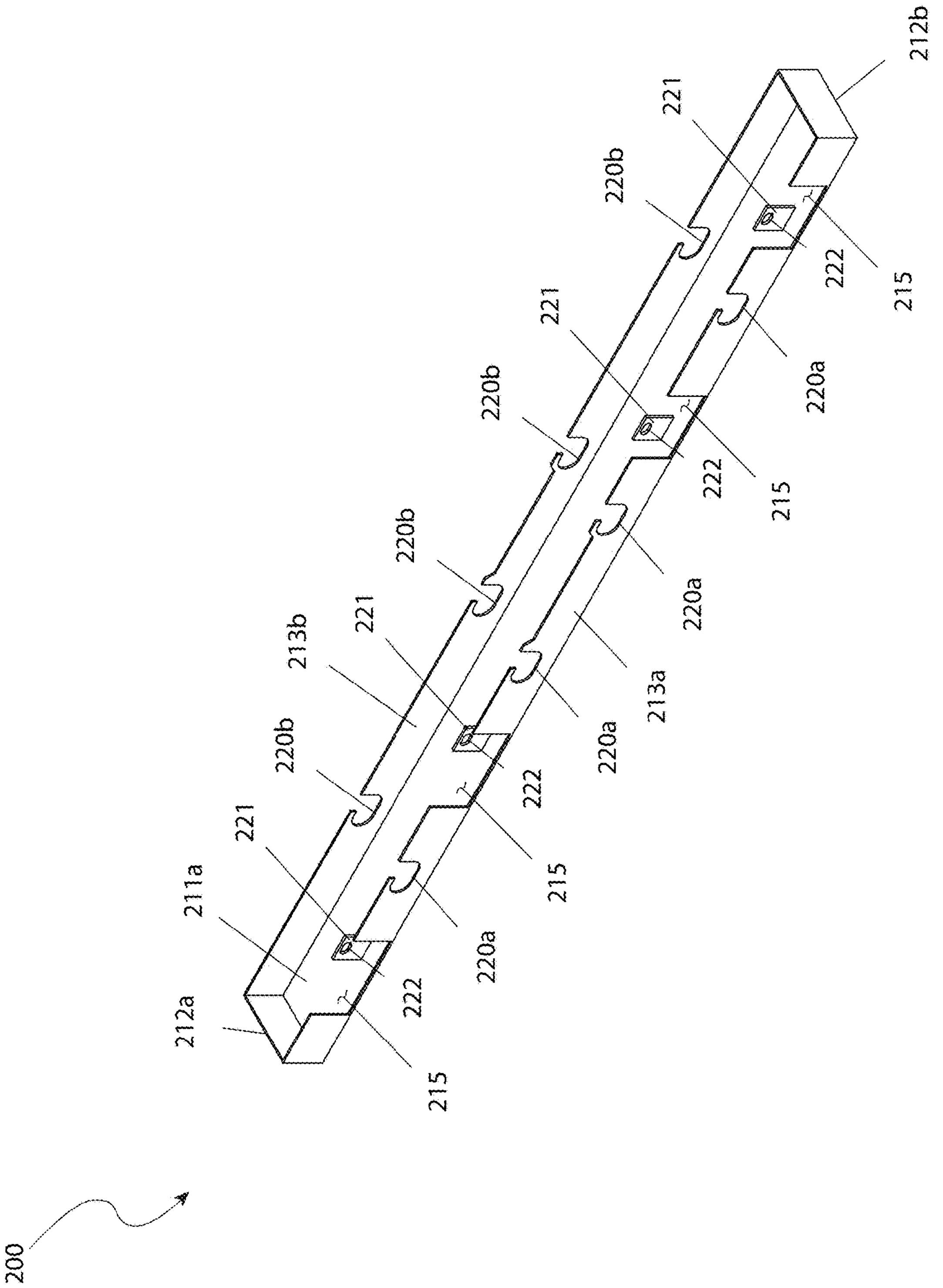
FIG. 7 is a first perspective view of a second alternate supplemental locking device, according to a second alternate embodiment of the present invention.
Figure 8:
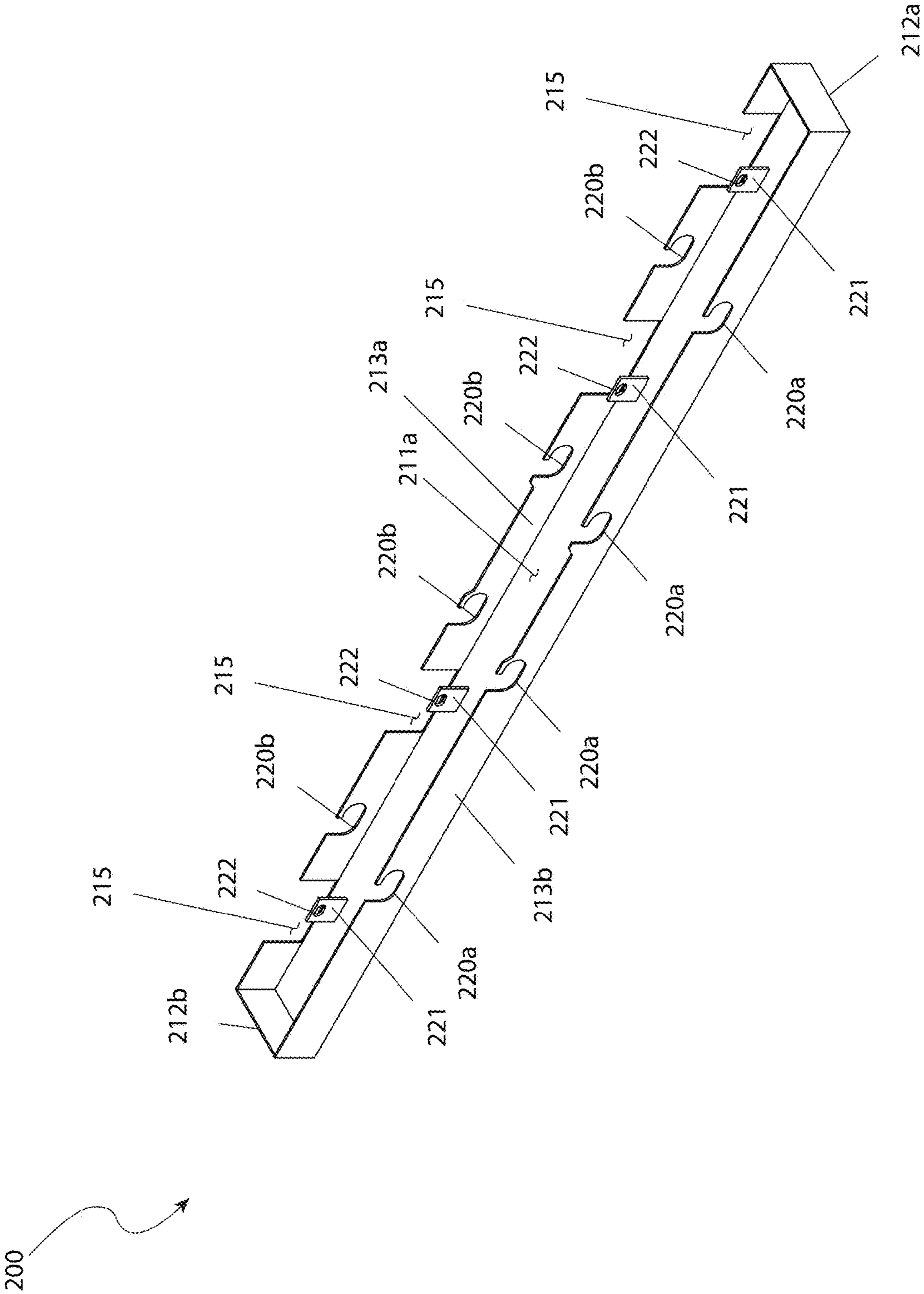
FIG. 8 is a second perspective view of the second alternate supplemental locking device, according to the second alternate embodiment of the present invention.
Figure 9:
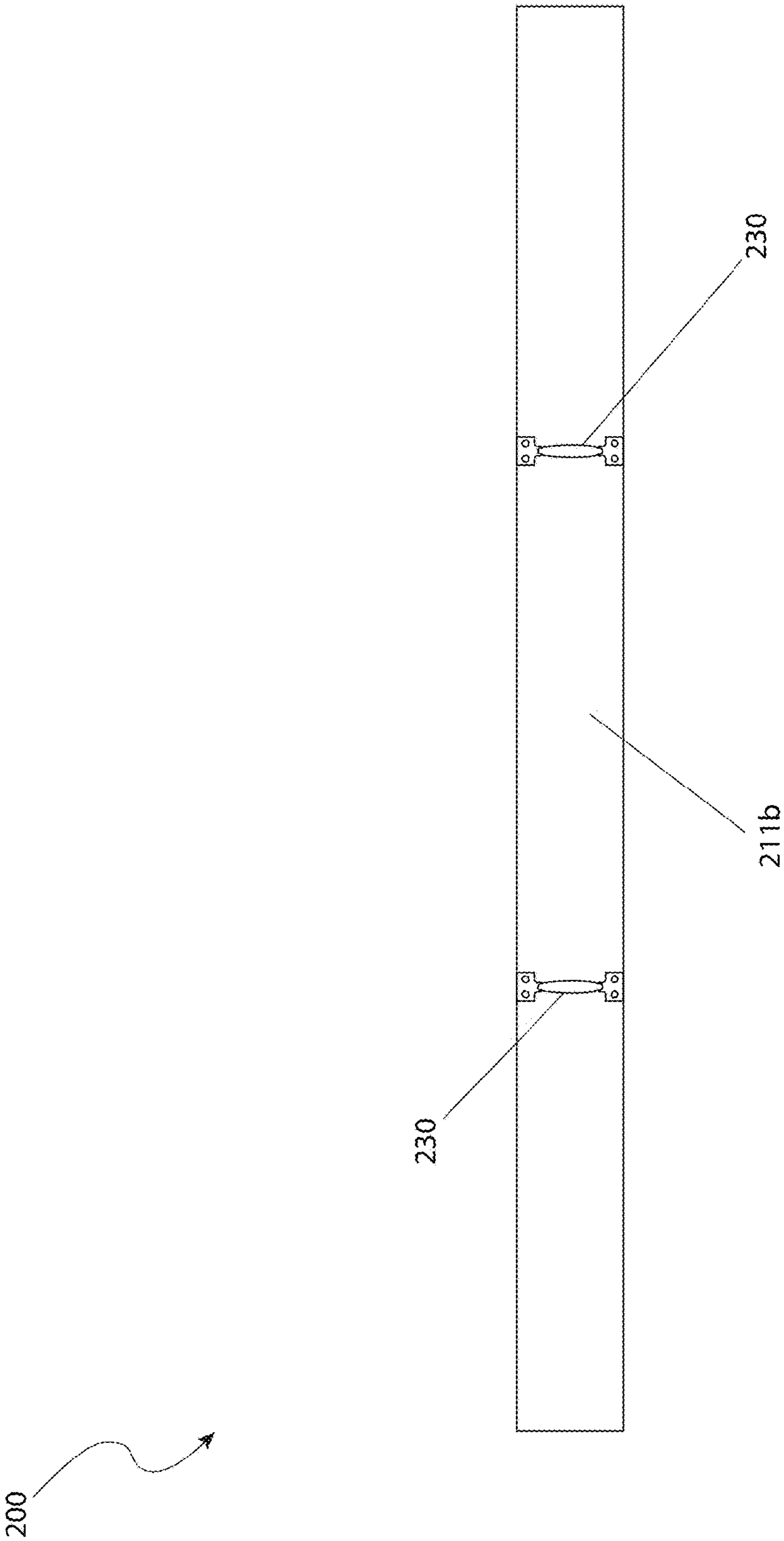
FIG. 9 is a front view of the second alternate supplemental locking device, according to the second alternate embodiment of the present invention.
Figure 10:
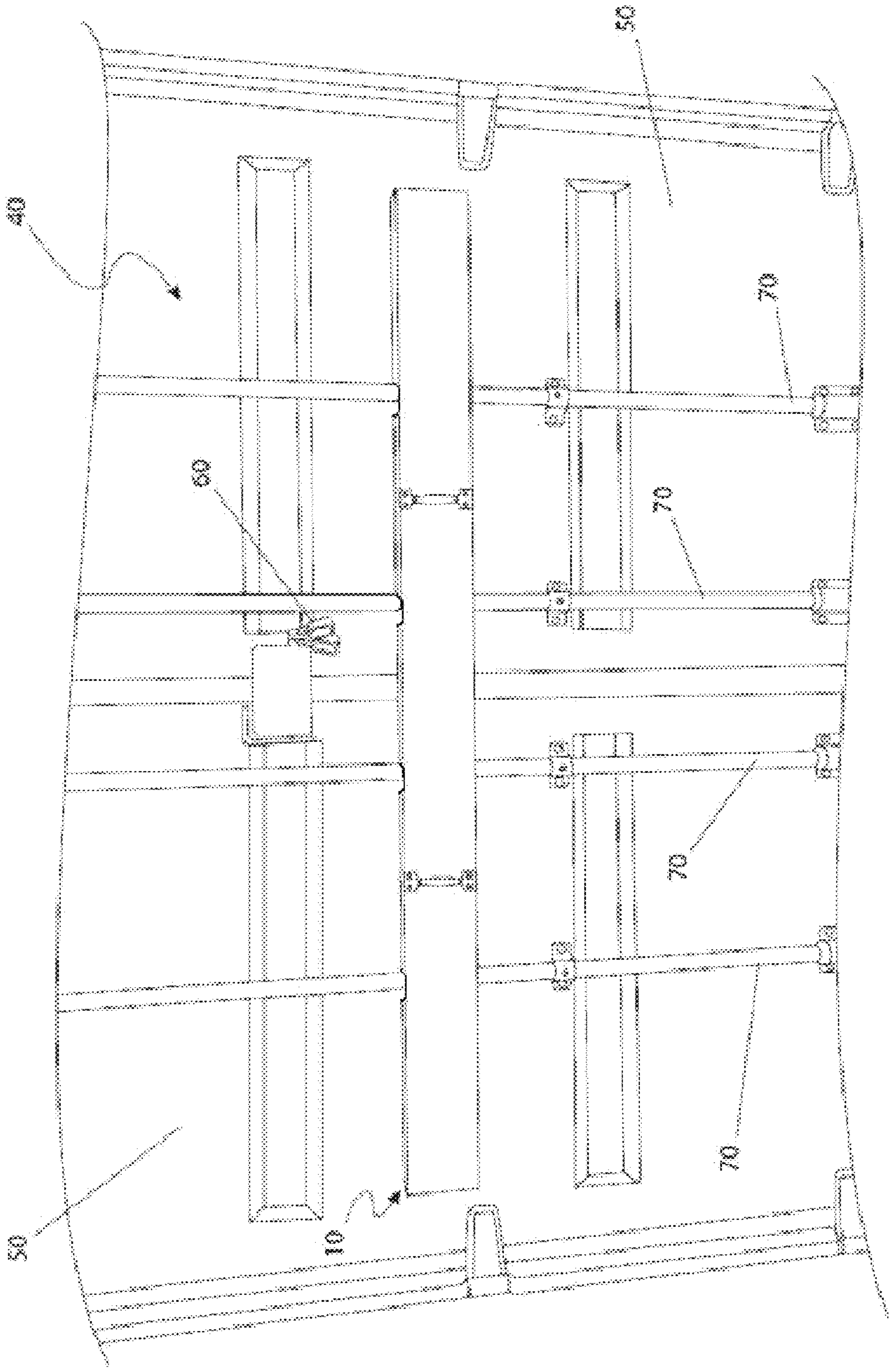
FIG. 10 is an environmental view of the device installed on a cargo container.

The best mode for carrying out the invention is presented in terms of its preferred embodiment 10, herein depicted within FIGS. 1 through 3, a first alternate embodiment 100 herein depicted within FIGS. 4 through 6, and a second alternate embodiment 200 herein depicted within FIGS. 7 through 9. FIG. 10 illustrates the preferred embodiment 10 as installed on the doors 50 of a cargo container 40. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring now to FIGS. 1 and 2, there is illustrated herein a supplemental locking device 10 that is particularly suited for providing an additional locking means, in addition to an existing locking means 60, for doors 50 of a cargo container 40 that has four (4) handle locking bars 70 for closing the doors 50 thereof. This can be seen in FIG. 10. The supplemental locking device 10 is generally shaped as a three-sided channel, having a bottom wall surface 11*a*, a top wall surface 11*b*, a first end wall 12*a*, a second end wall 12*b* opposite the first end wall 12*a*, a first side wall 13*a*, and a second side wall 13*b* opposite the first side wall 13*a*. A plurality of side wall notches 15 are formed along the first side wall 13*a* and extend downward and may or may not be equidistantly spaced apart from each other. The side wall notches 15 are coextensive with the height of the first side wall 13*a*. In the exemplary embodiment, there are four (4) side wall notches 15. The side wall notches 15 are shaped to accommodate the bar 70 (or other features) of a door 50 of a cargo container 40.

A plurality of first side wall slots 20*a* are formed along the top portion of the first side wall 13*a*, not interfering with any of the side wall notches 15 and extend downward and forward. A plurality of second side wall slots 20*b* are formed along the top portion of the second side wall 13*b* and extend downward and forward. The first side wall slots 20*a* and second side wall slots 20*b* are aligned with each other and in the exemplary embodiment, number four (4). The plurality of first side wall slots 20*a* and plurality of second side wall slots 20*b* typically also have a laterally extending section (i.e., extending toward the first side wall 12*a*) shaped to accommodate the bar 70 (or other features) of a door 50 of a cargo container 40. A plurality of upright members 21 are formed along a bisecting longitudinal axial centerline of the bottom wall surface 11*a* and extend upward therefrom a terminate prior to the top edges of the first end wall 12*a*, second end wall 12*b*, first side wall 13*a*, and second side wall 13*b*. Located adjacent the upper edge of each upright member 21 is an aperture 22. In the exemplary embodiment, there are four (4) upright members 21.

Referring now to FIG. 3, there is illustrated a front view of the supplemental locking device 10, thereby showing the planar top wall surface 11*b*. At least one (1) handle 30 can be affixed to the top wall surface 11*b* to enable manipulating of the supplemental locking device 10 onto the door 50 of the cargo container 40.

Referring now to FIGS. 4 and 5, there is illustrated herein a first alternate supplemental locking device 100 that is particularly suited for providing an additional locking means, in addition to an existing locking means 60, to a cargo container 40 that has three (3) handle locking bars 70 for closing the doors 50 thereof. The first alternate supplemental locking device 100 is generally shaped as a three-sided channel, having a first alternate bottom wall surface 111*a*, a first alternate top wall surface 111*b*, a first alternate first end wall 112*a*, a first alternate second end wall 112*b* opposite the first alternate first end wall 112*a*, a first alternate first side wall 113*a*, and a first alternate second side wall 113*b* opposite the first alternate first side wall 113*a*. A plurality of first alternate side wall notches 115 are formed along the first alternate first side wall 113*a* and extend downward and may or may not be equidistantly spaced apart from each other. The first alternate side wall notches 115 are coextensive with the height of the first alternate first side wall 113*a*. In the exemplary embodiment, there are four (4) first alternate side wall notches 115. The first alternate side wall notches 115 are shaped to accommodate the bar 70 (or other features) of a rear door 50 of a vehicle 40.

A plurality of first alternate first side wall slots 120*a* are formed along the top portion of the first alternate first side wall 113*a*, not interfering with any of the first alternate side wall notches 115 and extend downward and forward. A plurality of first alternate second side wall slots 120*b* are formed along the top portion of the first alternate second side wall 113*b* and extend downward and forward. The first alternate first side wall slots 120*a* and first alternate second side wall slots 120*b* are aligned with each other and in the exemplary embodiment, number four (4). The plurality of first alternate first side wall slots 120*a* and plurality of first alternate second side wall slots 120*b* typically also have a laterally extending section (i.e., extending toward the first alternate first side wall 112*a*) shaped to accommodate the bar 70 (or other features) of a door 50 of a cargo container 40. A plurality of first alternate upright members 121 are formed along a bisecting longitudinal axial centerline of the first alternate bottom wall surface 111*a* and extend upward therefrom a terminate prior to the top edges of the first alternate first end wall 112*a*, first alternate second end wall 112*b*, first alternate first side wall 113*a*, and first alternate second side wall 113*b*. Located adjacent the upper edge of each first alternate upright member 121 is a first alternate aperture 122. In the exemplary embodiment, there are four (4) first alternate upright members 121.

Referring now to FIG. 6, there is illustrated a front view of the first alternate supplemental locking device 100, thereby showing the planar first alternate top wall surface 111*b*. At least one (1) first alternate handle 130 can be affixed to the first alternate top wall surface 111*b* to enable manipulating of the first alternate supplemental locking device 100 onto the door 50 of the cargo container 40.

Referring now to FIGS. 7 and 8, there is illustrated herein a second alternate supplemental locking device 200 that is particularly suited for providing an additional locking means, in addition to an existing locking means 60, to a cargo container 40 that has four (4) handle locking bars 70 in a different position and orientation than that suited for the supplemental locking device 10 (e.g., a cargo container 40 typically capable of loading on a tractor trailer) for closing the doors 50 thereof. The second alternate supplemental locking device 200 is generally shaped as a three-sided channel, having a second alternate bottom wall surface 211*a*, a second alternate top wall surface 211*b*, a second alternate first end wall 212*a*, a second alternate second end wall 212*b* opposite the second alternate first end wall 212*a*, a second alternate first side wall 213*a*, and a second alternate second side wall 213*b* opposite the second alternate first side wall 213*a*. A plurality of second alternate side wall notches 215 are formed along the second alternate first side wall 213*a* and extend downward and may or may not be equidistantly spaced apart from each other. The second alternate side wall notches 215 are coextensive with the height of the second alternate first side wall 213*a*. In the exemplary embodiment, there are four (4) second alternate notches 215. The second alternate side wall notches 215 are shaped to accommodate the bar 70 (or other features) of a door 50 of a cargo container 40.

A plurality of second alternate first side wall slots 220*a* are formed along the top portion of the second alternate first side wall 213*a*, not interfering with any of the second alternate side wall notches 215 and extend downward and forward. A plurality of second alternate second side wall slots 220*b* are formed along the top portion of the second alternate second side wall 213*b* and extend downward and forward. The second alternate first side wall slots 220*a* and second alternate second side wall slots 220*b* are aligned with each other and in the exemplary embodiment, number four (4). The plurality of second alternate first side wall slots 220*a* and plurality of second alternate second side wall slots 120*b* typically also have a laterally extending section (i.e., extending toward the second alternate first side wall 212*a*) shaped to accommodate the bar 70 (or other features) of a door 50 of a cargo container 40. A plurality of second alternate upright members 221 are formed along a bisecting longitudinal axial centerline of the second alternate bottom wall surface 211*a* and extend upward therefrom a terminate prior to the top edges of the second alternate first end wall 212*a*, second alternate second end wall 212*b*, second alternate first side wall 213*a*, and second alternate second side wall 213*b*. Located adjacent the upper edge of each second alternate upright member 221 is a second alternate aperture 222. In the exemplary embodiment, there are four (4) second alternate upright members 221.

Referring now to FIG. 9, there is illustrated a front view of the second alternate supplemental locking device 100, thereby showing the planar second alternate top wall surface 211*b*. At least one (1) second alternate handle 230 can be affixed to the second alternate top wall surface 211*b* to enable manipulating of the second alternate supplemental locking device 200 onto the door 50 of the cargo container 40.

The supplemental locking device 10, first alternate supplemental locking device 100, and second alternate supplemental locking device 200 are each preferably fabricated out of heavy-gauge steel (e.g., folded ten-gauge steel) that fits over the features of a closing and locking mechanism of a cargo container 40 and are intended to act as a second and more secure means to secure the cargo container 40 in addition to the existing locking means 60.

After a cargo container 40 having four (4) locking bars 710 is locked, the supplemental locking device 10 is slipped thereover particularly by positioning the first side wall slots 20*a* and second side wall slots 20*b* on the horizontal members. Then, additional padlocks are installed through the apertures 22 of the upright members 21, thus enhancing the security of the doors 50 of the cargo containers 40. The supplemental locking device 10, when installed, will completely cover the handles of the cargo container 40.

After a cargo container 40 having three (3) locking bars 70 is locked, the first alternate supplemental locking device 100 is slipped thereover particularly by positioning the first alternate first side wall slots 120*a* and first alternate second side wall slots 120*b* on the horizontal members. Then, additional padlocks are installed through the first alternate apertures 122 of the first alternate upright members 121, thus enhancing the security of the doors 50 of the cargo containers 40. The first alternate supplemental locking device 100, when installed, will completely cover the handles of the cargo container 40.

After a cargo container 40 having four (4) locking bars 70 in a different orientation than that required for the supplemental locking device 10 is locked, the second alternate supplemental locking device 200 is slipped thereover particularly by positioning the second alternate first side wall slots 220*a* and second alternate second side wall slots 220*b* on the horizontal members. Then, additional padlocks are installed through the second alternate apertures 222 of the second alternate upright members 221, thus enhancing the security of the doors 50 of the cargo containers 40. The second supplemental locking device 200, when installed, will completely cover the handles of the cargo container 40.

It is appreciated the amount of side wall notches 15 in the preferred embodiment of the supplemental locking device 10, the amount of first alternate side wall notches 115 in the first alternate embodiment of the supplemental locking device 100, or the amount of second alternate side wall notches 215 in the second alternate embodiment of the supplemental locking device 200 may match or exceed the amount of bars 70 present on the rear doors 50 of the vehicle 40. These notches 15, 115, 215, are also located on the respective supplemental locking device 10, 100, 200 to be used on the vehicle 40, such that the notches 15, 115, 215 align with the bars 70. In certain embodiments, the size, location, and amount of notches 15, 115, 215, of any of the embodiments of the supplemental locking device 10, 100, 200, are governed by the amount and size of the bars 70, and may be sized to cover only a single rear door 50 if necessary. In certain embodiments, one or more notches along a side wall may provide clearance for structural features on or near a cargo container door. Such features may include door bars, latch hardware, lock housings, or other protrusions associated with the door assembly. In some configurations, the notches may also facilitate positioning or installation of the supplemental locking device by allowing it to bypass or align with existing door hardware. Accordingly, the notches may function to accommodate various door configurations and are not limited to engagement with a single specific type of component.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A supplemental locking device, comprising:

a bottom wall surface, a top wall surface, a first end wall, a second end wall opposite the first end wall, a first side wall, and a second side wall opposite the first side wall;

a plurality of side wall notches disposed along the first side wall, the side wall notches extend downward;

a plurality of first side wall slots disposed along the top portion of the first side wall;

a plurality of second side wall slots disposed along the top portion of the second side wall, the first side wall slots and the second side wall slots are aligned with each other;

a plurality of upright members disposed along a bisecting longitudinal axial centerline of the bottom wall surface, the upright members extend upward therefrom and terminate prior to top edges of the first end wall, the second end wall, the first side wall, and the second side wall;

an aperture disposed adjacent an upper edge of each of the upright members; and at least one handle affixed to the top wall surface adapted to enable manipulating of the supplemental locking device onto a door of a cargo container; and, wherein the side wall notches are configured to provide clearance for a protruding structural feature associated with the door to facilitate positioning of the supplemental locking device; and, wherein the first side wall slots and the second side wall slots each include a laterally extending portion configured to receive a locking member or door-mounted hardware during installation.

2. The supplemental locking device, according to claim 1, wherein the side wall notches are equidistantly spaced apart from each other.

3. The supplemental locking device, according to claim 1, wherein the side wall notches are coextensive with the height of the first side wall.

4. The supplemental locking device, according to claim 1, wherein the first side wall slots extend downward and forward.

5. The supplemental locking device, according to claim 1, wherein the second side wall slots extend downward and forward.

6. A first alternate supplemental locking device, comprising:

a first alternate bottom wall surface, a first alternate top wall surface, a first alternate first end wall, a first alternate second end wall opposite the first alternate first end wall, a first alternate first side wall, and a first alternate second side wall opposite the first alternate first side wall;

a plurality of first alternate side wall notches disposed along the first alternate first side wall, the first alternate side wall notches extend downward;

a plurality of first alternate first side wall slots disposed along the top portion of the first alternate first side wall, the first alternate first side wall slots extend downward and forward;

a plurality of first alternate second side wall slots disposed along the top portion of the first alternate second side wall, the first alternate second side wall slots extend downward and forward;

a plurality of first alternate upright members disposed along a bisecting longitudinal axial centerline of the first alternate bottom wall surface and extend upward therefrom and terminate prior to top edges of the first alternate first end wall, the first alternate second end wall, the first alternate first side wall, and the first alternate second side wall;

a first alternate aperture disposed adjacent an upper edge of each of the first alternate upright member; and at least one first alternate handle affixed to the first alternate top wall surface adapted to enable manipulating of the first alternate supplemental locking device onto a door of a cargo container; and, wherein the first alternate side wall notches are configured to provide clearance for a protruding structural feature associated with the door to facilitate positioning of the first alternate supplemetnal locking device; and, wherein the first alternate side wall slots and the first alternate second side wall slots each include a laterally extending portion configured to receive a locking member or door-mounted hardware during installation.

7. The first alternate supplemental locking device, according to claim 6, wherein the first alternate side wall notches are equidistantly spaced apart from each other.

8. The first alternate supplemental locking device, according to claim 6, wherein the first alternate side wall notches are coextensive with the first alternate first side wall.

9. The first alternate supplemental locking device, according to claim 6, wherein the first alternate first side wall slots and the first alternate second side wall slots are aligned with each other.

10. The first alternate supplemental locking device, according to claim 6, wherein the first alternate first side wall slots and the first alternate second side wall slots have a laterally extending section shaped to accommodate a bar of the door of the cargo container.

11. The first alternate supplemental locking device, according to claim 6, wherein the first alternate wall notches are coextensive with the height of the first alternate first side wall.

12. The first alternate supplemental locking device, according to claim 6, wherein the first alternate supplemental locking device is each fabricated out of heavy-gauge steel.

* * * * *